United States Patent [19]
Tsutsumi et al.

[11] 4,001,177
[45] Jan. 4, 1977

[54] FLAME-RETARDING POLYAMIDE COMPOSITION

[75] Inventors: Tadao Tsutsumi, Nagoya; Nobuo Kato, Aichi; Masanobu Morikawa; Toshikazu Aoyama, both of Nagoya; Kazumi Nagai, Shiga, all of Japan

[73] Assignee: Toray Industries, Inc., Tokyo, Japan

[22] Filed: Nov. 3, 1975

[21] Appl. No.: 628,338

[30] Foreign Application Priority Data
Nov. 7, 1974   Japan ............................ 49-127521

[52] U.S. Cl. ................. 260/45.8 NT; 260/45.8 A; 260/78 S; 260/78 SC
[51] Int. Cl.[2] ........................................... C08K 5/34
[58] Field of Search ...... 260/45.8 NT, 78 S, 78 SC; 106/15 FP

[56] References Cited

UNITED STATES PATENTS

| | | | |
|---|---|---|---|
| 3,660,344 | 5/1972 | Michael et al. ...................... | 260/37 |
| 3,793,289 | 2/1974 | Koch et al. ........................ | 260/45.8 |
| 3,931,101 | 1/1976 | Dany et al. ........................ | 260/45.8 |
| 3,943,100 | 3/1976 | Berenbaum et al. ............ | 260/45.85 |
| 3,950,306 | 4/1976 | Pews et al. ........................ | 260/45.8 |

*Primary Examiner*—Donald E. Czaja
*Assistant Examiner*—R. A. White

[57] ABSTRACT

Flame-retarding polyamide composition having excellent mechanical and flame retardant properties is disclosed. The composition comprises polyamide, about 3 to 40% by weight of melamine on the basis of the polyamide, and about 0.5 to 20% by weight on the basis of the polyamide and about 2 to 75% by weight on the basis of melamine of a compound represented by a compound selected from the group consisting of the following formulas (I) and (II)

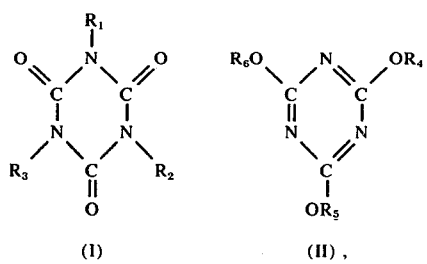

wherein $R_1$, $R_2$, $R_3$, $R_4$, $R_5$ and $R_6$ are the same or different radicals selected from the group consisting of hydrogen, alkyl, alicyclic and aromatic radicals having from 1 to 10 carbon atoms, and from such radicals having a substituent selected from the group consisting of —OH, —COOR' and —CONH$_2$, wherein R' is aliphatic alkyl group having from 1 to 5 carbon atoms.

9 Claims, No Drawings

FLAME-RETARDING POLYAMIDE COMPOSITION

BRIEF DESCRIPTION OF THE INVENTION

This invention relates to a flame-retarding polyamide composition having excellent mechanical properties.

Polyamides have been applied to various uses such as fibers for clothing and industrial use, plastics and adhesives, because of their superior mechanical, electrical and shaping properties and their chemical stability. In many of those fields, however, it has recently been desired to provide polyamides having a high level of flame retardancy in addition to the good mechanical properties that polyamides inherently have.

PRIOR ART

There are in existence some known methods for making high polymer flame-retardatives. For example, a flame-retarding monomer may be copolymerized with the monomer which forms the polymer chain. A flame-retarding agent may also be blended with the polymer. The surface of the polymer may be coated with a flame retarding layer. Among these methods, blending is the most practical for producing polyamide flame-retardants, especially for fibers and plastics.

While many compounds containing phosphorus, halogen or nitrogen atoms are known as flame retarding agents for use with polymeric materials, the most usual method involves the use of an organic halogen compound together with a metal oxide such as antimony oxide. In the case of polyamides, however, comparatively large amounts of flame-retarding agents are required to provide a level of flame retardancy which is high enough to attain a ranking of V-O in the test specified in UL Subject 94. Therefore, it is difficult to make polyamides flame-retardative without losing the original desirable properties of tenacity and pliability.

The addition of 2,4,6-triamino-1,3,5-triazine (hereinafter described as melamine) into polyamide has also been proposed for the purpose of improving the flame-retarding properties of polyamides. For example, in U.S. Pat. No. 3,660,344 there is disclosed a self-extinguishing polyamide composition containing 0.5 to 25% by weight of melamine.

Melamine is neither toxic nor corrosive to metal and is furthermore inexpensive, but it has only poor solubility in polyamides. For this reason, melamine has some limitations as a flame-retarding agent for polyamides.

It is quite difficult to disperse melamine uniformly in polyamides. Therefore the mechanical properties of polyamides, such as tenacity and pliability deteriorate, and satisfactory flame-retarding properties cannot be obtained.

Thus, an important object of this invention is to provide a flame-retarding composition having excellent mechanical properties and containing melamine as a flame-retarding agent.

DETAILED DESCRIPTION OF THE INVENTION

We now have found that the foregoing obstacles and disadvantages may be overcome by providing a flame-retarding polyamide composition which comprises a polyamide, melamine and a cyanurate or isocyanurate derivative.

The quality or type of melamine in accordance with this invention is not specifically restricted. Melamine powders commercially available as raw materials for melamine formaldehyde resin may be used in the present practice of the invention. Melamine may be re-crystallized from an aqueous solution and mechanically pulverized and may contain a small amount of a melamine dimer called melan. The melamine is preferably in the form of a fine powder having an average diameter of less than about $50\mu$.

The amount of melamine in the polyamide composition of the present invention is about 3 to 40%, preferably 5 to 30%, by weight on the basis of polyamide. Less than about 3% by weight of melamine is not enough to give good flame-retarding properties to polyamides. More than about 40% by weight of melamine is difficult to disperse uniformly in the polyamide.

The cyanurate or isocyanurate derivatives used in the practice of the present invention may be either liquid or solid at room temperature, but should have such a comparatively high boiling point that the derivative does not volatilize at the temperature of melt-spinning or molding of the polyamide. The compound may preferably have a boiling point under atmospheric pressure of more than about 250°0 C. The solid compound may preferably have a melting point of less than about 300° C and an average diameter of less than about $100\mu$. The compound may be represented by either of the following formulas (I) and (II):

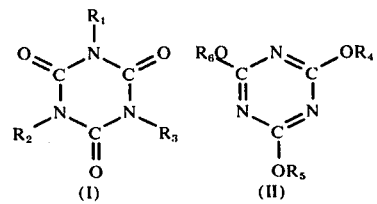

wherein $R_1$ to $R_6$ are the same or different radicals selected from the group consisting of hydrogen, alkyl, alicyclic and aromatic radicals having from 1 to 10 carbon atoms, said radicals may include a substituent selected from the group consisting of —OH, —COOR' and —CONH$_2$, wherein R' is an alkyl group having from 1 to 5 carbon atoms.

Examples of the cyanurate or isocyanurate derivatives include tris-(2-hydroxyethyl) isocyanurate, tris-(2-carbethoxyethyl) isocyanurate, trimethylisocyanurate, tris-(2-carbamoylethyl) isocyanurate, trimethylcyanurate diphenyl cyanurate, tris-(2-hydroxyethyl) cyanurate, dimethylphenylcyanurate and isocyanuric acid, for example. Preferable cyanurate or isocyanurate derivatives include tris-(2-hydroxyethyl) isocyanurate, tris-(2-carboethoxyethyl) isocyanurate and trimethyl cyanurate.

The amount of the cyanurate or isocyanurate derivative may be about 0.5 to 20% by weight, preferably 0.5 to 10% by weight, on the basis of the polyamide. The amount of cyanurate or isocyanurate derivative may also be about 2 to 75% by weight, preferably 5 to 50% by weight, on the basis of the melamine.

The polyamide which is utilized in the present invention is not specifically restricted to any specific polyamide. It may be a homo- or co- polyamide prepared by polycondensation of lactams, aminocarboxylic acids and/or salts of diamine and dicarboxylic acid. A blend of more than two kinds of polyamides may also be used. Poly-caproamide (Nylon 6) and poly-hexamethyleneadipamide (Nylon 66) are typical polyamides, but other homo-polyamides may be used such as Nylon 4, Nylon 8, Nylon 11, Nylon 12, Nylon 69, Nylon 610, Nylon 612, and their copolyamides and terpolyamides such as Nylon 6/66, Nylon 6/12, Nylon 6/6T (wherein T means terephthalic acid), Nylon 66/BAC 6 (wherein BAC means 1,3- or 1,4-bis-aminomethylcyclohexane), Nylon 6/66/12, and Nylon 6/610/PACM 10 (wherein PACM means 4,4'-diaminodicyclohexylmethane). Preferable polyamides include Nylon 6, Nylon 66, Nylon 610, Nylon 11, Nylon 12 and their copolyamides. These polyamides are preferable also in view of cost, and of their physical properties for fiber or molding compositions.

The polyamide composition of the present invention may be prepared by conventional methods. It is naturally preferable that the melamine and other additives be dispersed in the polyamide as uniformly as possible. Therefore, methods which are suitable for obtaining a uniform dispersion may be used. In accordance with one practical method, melamine and cyanurate or isocyanurate may be added to the polyamide while the polyamide is in the form of chips. After optionally mixing the chips to obtain a uniform blend in a mixer, the blend may be fed to the hopper of an extruder, melt-blended through the extruder, and formed into pellets of the polyamide composition. In another method, the melamine and the cyanurate or isocyanurate derivative may be uniformly mixed and formed into tablets by conventional methods. A blend of the tablets thus obtained with polyamide chips may be fed to an extruder for pelletizing. The blend may also be directly fed to a molding machine such as an injection molder and melt-spinner.

A master pellet containing a high concentration of melamine and a cyanurate or isocyanurate compound may be prepared by using polyamides or other polymers. The master pellet may be blended with polyamide chips. Melamine and a cyanurate or isocyanurate derivative may also be added to the polymerization vessel.

The polyamide composition of the present invention may further contain dyestuffs, pigments, fillers, fiber-reinforcing agents, lubricants, plasticizers, antistatic agents and stabilizers.

The flame retarding polyamide composition of the present invention has excellent mechanical properties, and can be used as a molding material for fibers, parts for electric or electronic instruments, interior and furniture. The composition of the present invention does not generate harmful gases which cause corrosion of dies, molds, spinners and molders, or deteriorate the working environment. Thus the composition is superior to known flame-retarding compositions containing halogen together with antimony oxide.

EXAMPLES

The invention is further illustrated by the following Examples:

The flame-retarding properties of the compositions in the Examples were evaluated by the method specified by the UL Subject 94 published in 1972 by Underwriters Laboratories. The mechanical properties were measured by the ASTM method referred to in the Examples.

EXAMPLE 1

10 parts by weight of finely pulverized melamine (average particle size 5 microns) and 3 parts by weight of tris-(2-hydroxyethyl) isocyanurate were blended with 100 parts by weight of polyhexamethylene adipamide (Nylon 66) having a relative viscosity ($\eta$ rel) (as measured on a solution of 1 gram of polyamide in 100 ml of sulfuric acid) in a mixer. The blend was extruded through a 65 mm diameter screw extruder at a temperature of 285° C.

The extruded strand was allowed to cool, cut into chips, and dried at 95° C for 15 hours under vacuum. Using chips thus obtained, test specimens having the following three sizes were prepared by injection molding.

| | | |
|---|---|---|
| (1) | 5 × ½ × 1/16 | (inch) |
| (2) | 5 × ½ × ⅛ | (inch) |
| (3) | 5 × ½ × ¼ | (inch) |

The flammability of these white opaque test specimens was tested in accordance with the method specified in UL Subject 94, and it was found that polyamide composition was classified as 94 V-O. The polyamide composition was also tested to tensile strength (ASTM D-638-56T) and impact strength Izod (ASTM D-256-56), and the following results were obtained:

| | |
|---|---|
| Tensile strength | 735 kg/cm$^2$ |
| Elongation | 25% |
| Impact strength Izod notch | 4.3 kg-cm/cm |

The composition of this example has good flame retarding properties together with excellent mechanical properties.

COMPARATIVE TEST 1

For purpose of comparison, polyamide compositions were prepared by blending 10 parts by weight consisting solely of melamine, or 10 parts by weight of melamine together with 3 parts by weight of tetrachlorophthalic anhydride. The compositions were formed and tested by the same method as in Example 1.

In each case, the extruded strands obtained from the above procedure had many protuberances, and as shown by this fact, the degree of dispersion of the additives was not good.

In addition, the combustion behavior of the material was unstable due to the coagulation of melamine powder, though the samples were ranked as 94 V-O. The results of the tests showed that these compositions were fragile and did not have good mechanical properties.

EXAMPLES 2 – 8

A blend of 70 parts by weight of melamine (average particle diameter 30 microns) and 30 parts by weight of tris (2-hydroxyethyl) isocyanurate was pelletized to tablets having a particle size of 3 mm$\phi$.

Various parts by weight of the tablets were melt blended with poly-$\epsilon$-caprolactam (Nylon 6) having a relative viscosity ($\eta$ rel) of 2.7 (in sulfuric acid) through an extruder, and thereby chips having a diameter of 3 mm$\phi$ of the polyamide composition were prepared.

The chips were formed into test specimens and were tested according to the same methods as described in Example 1. The resulting appear in the following Table:

Table 1

| | Ingredients (wt%) | | | Burning rating (UL-94) | Description of product | Mechanical property | | |
|---|---|---|---|---|---|---|---|---|
| | Nylon 6 | Melamine | THEIC* | | | Tensile strength (kg/cm²) | Elongation (%) | Impact Strength Izod Notch (kg/cm/cm) |
| Comparative Test 2 | 100 | 0 | 0 | below V-2 | transparent | 760 | 200 | 5.0 |
| Example 2 | 97 | 2.1 | 0.9 | below V-2 | white opaque good | 740 | 110 | 4.5 |
| 3 | 95 | 3.5 | 1.5 | V-2 | " | 750 | 85 | 4.1 |
| 4 | 90 | 7 | 3 | V-0 | " | 760 | 65 | 4.2 |
| 5 | 85 | 10.5 | 4.5 | V-0 | " | 765 | 50 | 4.0 |
| 6 | 80 | 14 | 6 | V-0 | " | 770 | 55 | 4.1 |
| 7 | 70 | 21 | 9 | V-0 | " | 775 | 40 | 3.8 |
| 8 | 65 | 24.5 | 10.5 | V-0 | " | 690 | 40 | 3.5 |
| 9 | 60 | 28 | 12 | V-0 | Partly protuberant | 600 | 7 | 2.5 |

As shown in Table 1, the flame retarding compositions of Nylon 6 that fall within the scope of this invention had good flame-retarding and mechanical properties.

EXAMPLES 10 – 14

A mixture comprising 15% by weight of ε-caprolactum and 85% by weight of hexamethylene adipamide equimolar salts were co-polymerized to form a copolyamide having a relative viscosity ($\eta$ rel) of 3.10 as measured on sulfuric acid solvent.

100 parts by weight of the copolyamide were preliminarily blended with 12 parts by weight of melamine and 4 parts by weight of the various cyanurates or isocyanurates as shown in Table 2.

The blend was extruded at a temperature of 245° C.

Using a method similar to that used in Example 1, the compositions were tested. The test results are indicated in the following Table 2.

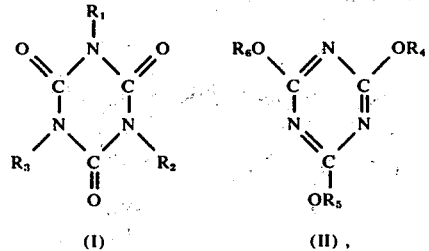

wherein $R_1$, $R_2$, $R_3$, $R_4$, $R_5$ and $R_6$ are the same or different radicals selected from the group consisting of hydrogen, alkyl, alicyclic and aromatic radicals having from 1 to 10 carbon atoms, and from such radicals having a substituent selected from the group consisting of —OH, —COOR' and —CONH$_2$, wherein R' is aliphatic alkyl group having from 1 to 5 carbon atoms.

Table 2

| N-6/66 = 100 | : | Ingredients (parts of weight) Melamine 12 | : | Cyanurate or isocyanurate 4 |
|---|---|---|---|---|

| Example | Additives Cyanurate or isocyanurate compound | Burning rating (UL-94) | Description of product | Mechanical Properties | | |
|---|---|---|---|---|---|---|
| | | | | Tensile Strength (kg/cm²) | Elongation (%) | Impact Strength (kg.cm/cm) |
| 10 | tris (2-carbethoxy ethyl) isocyanurate | V-0 | white opaque | 730 | 55 | 4.3 |
| 11 | tris (2-carbamoyl ethyl) isocyanurate | V-0 | " | 725 | 50 | 4.5 |
| 12 | tris (2-hydroxypropyl) cyanurate | V-0 | " | 740 | 70 | 4.6 |
| 13 | tris (2-hydroxyethyl) isocyanurate | V-0 | " | 720 | 65 | 4.0 |
| 14 | trimethylcyanurate | V-0 | " | 700 | 40 | 4.2 |
| Comparative Test 3 | none | V-0 | white partly protuberant | 650 | 6 | 3.2 |

What we claim is:

1. A flame-retarding polyamide composition which comprises polyamide having receiving amide groups as integral parts of the main polymer chain, about 3 to 40% by weight of melamine on the basis of the polyamide, and about 0.5 to 20% by weight on the basis of the polyamide and about 2 to 75% by weight on the basis of melamine of a compound represented by a compound selected from the group consisting of the following formulas (I) and (II):

2. A flame-retarding polyamide composition of claim 1, wherein the amount of melamine is about 5 to 30% by weight on the basis of polyamide.

3. A flame-retarding polyamide composition of claim 1, wherein the amount of cyanurate or isocyanurate compound is about 0.5 to 10% by weight on the basis of the polyamide and about 5 to 50% by weight on the basis of melamine.

4. A flame-retarding polyamide composition of claim 1, wherein the cyanurate or isocyanurate compound is selected from the group consisting of the following general formulas (I) and (II):

wherein $R_1$, $R_2$, $R_3$, $R_4$, $R_5$ and $R_6$ are alkyl, alicyclic or aromatic radicals having 1 to 10 carbon atoms.

5. A flame-retarding polyamide composition of claim 4, wherein the compound is trimethyl cyanurate.

6. A flame-retarding polyamide composition of claim 1, wherein the cyanurate or isocyanurate compound is selected from the group consisting of the following general formulas (I) and (II):

wherein $R_1$, $R_2$, $R_3$, $R_4$, $R_5$ and $R_6$ are alkyl radicals having 2 to 10 carbon atoms and a hydroxyl substituent.

7. The flame-retarding polyamide composition of claim 6, wherein the compound is tris-(2-hydroxyethyl) isocyanurate.

8. The flame-retarding polyamide composition of claim 1, wherein the cyanurate or isocyanurate compound is selected from the group consisting of the following general formulas (I) and (II):

wherein $R_1$, $R_2$, $R_3$, $R_4$, $R_5$ and $R_6$ are alkyl, alicyclic or aromatic radicals having 2–10 carbon atoms and a —$CONH_2$ substituent.

9. The flame-retarding polyamide composition of claim 1 wherein the compound is tris-(2-carbamoylethyl) isocyanurate.

* * * * *